(12) United States Patent
Saumer (10) Patent No.: US 9,444,262 B2
(45) Date of Patent: Sep. 13, 2016

(54) BUS SYSTEM

(71) Applicant: SICK AG, Waldkirch/Breisgau (DE)

(72) Inventor: Markus Saumer, Friesenheim (DE)

(73) Assignee: SICK AG, Waldkirch/Breisgau (DE)

( * ) Notice: Subject to any disclaimer, the term of this patent is extended or adjusted under 35 U.S.C. 154(b) by 451 days.

(21) Appl. No.: 14/043,967

(22) Filed: Oct. 2, 2013

(65) Prior Publication Data

US 2014/0097679 A1    Apr. 10, 2014

(30) Foreign Application Priority Data

Oct. 10, 2012   (EP) ..................... 12187995

(51) Int. Cl.
*H02J 1/10*      (2006.01)
*H02J 4/00*      (2006.01)
*H04L 12/40*     (2006.01)

(52) U.S. Cl.
CPC ........... *H02J 4/00* (2013.01); *H04L 12/40045* (2013.01); *Y10T 307/305* (2015.04)

(58) Field of Classification Search
CPC . H04L 12/40045; H02J 4/00; Y10T 307/305
USPC ........................................................ 307/18
See application file for complete search history.

(56) References Cited

U.S. PATENT DOCUMENTS

| | | | |
|---|---|---|---|
| 4,630,233 A | 12/1986 | Weppler | |
| 7,974,058 B2* | 7/2011 | Maigret | ................. H01H 89/06 200/51.02 |
| 2006/0244619 A1 | 11/2006 | Nickels | |
| 2008/0224850 A1* | 9/2008 | Indefrey | ................. H02H 9/008 340/532 |

(Continued)

FOREIGN PATENT DOCUMENTS

| | | |
|---|---|---|
| DE | 102004020997 A1 | 11/2005 |
| DE | 102008032823 A1 | 1/2010 |

(Continued)

OTHER PUBLICATIONS

ODVA Planning and Installation Manual, DeviceNet Cable System, Copyright 2002-2003, PUB000271R1.

(Continued)

*Primary Examiner* — Jared Fureman
*Assistant Examiner* — Duc M Pham
(74) *Attorney, Agent, or Firm* — Nath, Goldberg & Meyer; Jerald L. Meyer; Stanley N. Protigal (57) ABSTRACT

The invention relates to a bus system comprising
  a bus line,
  a plurality of consumers of electric power which are connected to one another via the bus line, having
  a plurality of separate electric current supply units which each make available an electric voltage for the current supply with at least one consumer.
The bus system is divided into segments each having one or more consumers respectively associated with a current supply unit and which each have a first current supply line and a second current supply line. The first current supply line and the second current supply line are respectively not directly electrically conductively connected to the first current supply line and to the second current supply line of a different segment and are preferably separated from the first current supply line and the second current supply line of the other segment in a galvanic manner.

18 Claims, 3 Drawing Sheets

(56) References Cited

U.S. PATENT DOCUMENTS

2009/0265571 A1* 10/2009 Furukawa ............... G06F 1/24
                                                       713/340
2011/0112700 A1   5/2011  Jajima

FOREIGN PATENT DOCUMENTS

| DE | 102011016137 A1 | 10/2010 |
| DE | 102010025675 B3 | 11/2011 |
| DE | 102011079688 A1 | 4/2012 |
| DE | 202010016148 U1 | 4/2012 |
| EP | 1393280 A1 | 10/2002 |
| EP | 1363306 A2 | 11/2003 |
| EP | 1699203 A1 | 9/2006 |
| EP | 2051422 A1 | 4/2009 |
| EP | 2101237 A2 | 9/2009 |
| EP | 2209262 A1 | 1/2010 |
| EP | 2362408 A1 | 8/2011 |

OTHER PUBLICATIONS

Search report date Jan. 30, 2013, from corresponding European patent application No. 12 187 995.1.

* cited by examiner

BUS SYSTEM

The present invention relates to a bus system, in particular to a bus system configured as a safety system.

Bus systems are used to connect a plurality of devices by means of a common bus line and to enable a data communication or a transmission of information between the devices via the bus line. For example, field bus systems represent a possibility of connecting a plurality of locally distributed devices to one another and possibly to a central control. The devices connected to the bus line represent typical consumers of electrical power and must correspondingly be supplied with an electric current.

It is known to supply a plurality of consumers connected to the bus system with a current by way of a common current supply unit which makes available an electric voltage, wherein the consumers are connected to the current supply unit via common first and second current supply line, between which the electric voltage is made available.

Moreover, a plurality of distributed current supply units can be provided at the bus system in order to reduce the line length of the consumers to the respectively closest current supply unit and the thereby brought about voltage drop. A plurality of current supply units arranged next to one another and connected in parallel can serve the purpose of increasing the electric power made available in the bus system.

Since the current flow to be expected in a current supply line of the described bus systems is dependent on the current demand of all consumers in the bus system, considerable maximum current intensities and considerable local and time related deviations of the current flow emerge in such a bus system. For this reason the bus system and, in particular the securing of the bus system with respect to dangerous electric overcurrents thus have to likewise be designed with respect to considerable current intensities and deviations of the current flow, whereby the electrical safety of the bus system is affected and/or the demand in effort and cost for the generation of a sufficient electrical securing satisfying the requirements with regard to the electrical safety is increased.

At the same time such bus systems are found to be susceptible to disturbances brought about by electromagnetic interferences, this means they have a limited electromagnetic tolerance (EMT), whereby the safety with respect to interferences achievable on the operation of the bus system is affected.

For this reason it is the object of the present invention of providing a bus system having a high electrical safety and a high safety with respect to interferences and which bus system can be made available with a low demand in effort and cost.

This object is satisfied in accordance with the features of claim 1.

The Bus system in accordance with the invention comprises a bus line, a plurality of consumers of electrical power which are connected to one another via the bus line and a plurality of separate electrical current supply units which respectively provide an electrical voltage for the current supply of at least one consumer. In this connection the bus system is divided into segments each having one or more consumers which are respectively associated with a current supply unit and which each have a first current supply line and a second current supply line via which the one or more consumers of the respective segment are electrically conductively connected to the associated current supply unit and between which the electrical voltage of the associated current supply unit is made available. In this connection a first voltage with respect to a ground potential is made available at the first current supply line and a second voltage different from the first voltage with respect to the ground potential is made available at the second current supply line, wherein, for example, one of the two current supply lines makes available the ground potential, this means a voltage related to the ground potential of zero Volts. In this connection the first current supply line and the second current supply line of a segment are each not directly electrically conductively connected to the first current supply line and the second current supply line of a different segment and are, in particular separated from the first current supply line and the second current supply line of the other segment in a galvanic manner.

The electrical securing of the bus system with respect to dangerous over-currents is considerably simplified and the electrical safety of the bus system is increased through this segmentation of the safety system with respect to the energy supply. The current flow in each segment of the safety system is substantially only influenced by the consumer arranged in the respective segment, due to the absence of a direct electrical connection between the first and the second current supply lines of different segments and/or the galvanic separation between these current supply lines. Thereby the maximum current intensities expected in the first and the second current supply lines, as well as the expected fluctuations of the current intensity in this current supply line are reduced. An electrical safe guarding which ensures the required safety is realizable with simple means, since these only have to be designed with respect to low maximum current flows and small fluctuations of the current flow. The different bus segments can be considered separate from one another with respect to the supply of energy and the electrical safe guarding on the design and/or implementation of the bus system, wherein only the consumers of a respective segment have to be considered on the design of the supply of energy and the electrical safe guarding of a segment. The design and/or planning of a bus system having an energy supply concept satisfying these requirements and having a high safety with respect to the electrical safe guarding against over-currents is thereby considerably simplified.

The influence of electromagnetic interferences is furthermore reduced during the operation of the bus system and the safety with regard to interferences of the bus system is increased through the division of the bus system into different segments having first and second current supply lines which are not directly connected to one another in an electrically conductive manner and which are separated from one another, in particular in a galvanic manner and through the thereby necessitated reduction and/or elimination of galvanic interactions between the current supply lines of separate segments.

Thus a flexible energy supply concept is created, which can be made available with a small demand in effort and cost and which ensures an increased electrical safety and interference freedom on the operation of the bus system.

The fact that the current supply lines of different segments are not directly electrically conductively connected to one another is to be understood such that the current supply lines of the different segments are separate from one another, this means these are not configured as a single current supply line, at least they are not in contact with one another in an electrically conductive manner in the low ohm region. A galvanic separation is to be understood such that no galvanic connection and/or coupling between the current supply lines is present, this means that no connection and/or coupling between the current supply lines is present which is capable of conducting electricity. A possibly present galvanic coupling of the current supply lines to one another via the superordinate supply grid by means of which the current supply units are connected to one another at the input side for their own power supply and current supply, possibly in a galvanic manner is in this connection not necessarily considered, this means that the galvanic separation relates to the bus system connected to the supply grid. However, also at least one current supply unit can be used which ensures a galvanic separation of the current supply lines from the current supply grid, such as, for example, a power supply having a transformer in such a way that also such a galvanic coupling is avoided and an absolute galvanic separation of the current supply lines can be ensured.

In principle one or more segments of the system can respectively be formed by exactly one consumer in the scope of the invention. However, the system preferably comprises one or more segments which each comprise at least two consumers. A reduced material and cabling demand for the current supply is ensured through the supply of a plurality of consumers of one segment by means of a common current supply unit. At the same time a degradation of the electrical safety or the interference freedom on the operation of the bus system is prevented in such a way that overall a secure and reliable and at the same time easy to realize bus system is generated through the separation of the current supply lines.

The current supply unit of a segment and of a consumer of the associated segment can be integrated into a common device. The current supply unit and the consumer of the segment can, however, likewise also be realized as separate devices which are connected to one another via respective current supply lines.

Advantageous embodiments of the invention are described in the subordinate claims, the description and the Figures.

The bus system advantageously comprises at least one bus signal path which is at least sectionally arranged in the bus line, via which the consumers are connected to one another and via which the bus signals can be transmitted between the consumers, the bus signals representing information transmitted by the bus system. In this connection each segment preferably comprises one or more participants of the bus system configured as electrical consumers which take part on the transmission of information via the bus system. The participants are preferably electrically conductively connected to the bus signal path in order to influence the signals transmitted via the bus signal path and to thereby transmit a piece of information generated by the respective participant via the bus signal path or in order to receive and to evaluate the signals transmitted via the bus signal path and the information contained therein.

The bus system can also comprise a plurality of such bus signal paths which can serve for the transmission of different bus signals and/or various pieces of information differing from one another.

The at least one bus signal path preferably has a plurality of sections which are coupled to one another in a non-galvanic and signal transmitting manner by means of a coupling unit. The coupling unit is adapted to carry out an optical, inductive and/or capacitive signal transmission between at least two sections of the bus signal path and, in particular between precisely two sections of the bus signal path, wherein the signals from the coupling unit are transmitted, preferably substantially unchanged, from a section of the bus signal path to a different section of the bus signal path. In an advantageous manner a signal and information transmitting connection between different sections of a bus signal path can be achieved without the two sections having to be connected to one another in an electrically conductive manner by a non-galvanic coupling described in the foregoing. A permanent signal transmission can take place by means of such a coupling unit. The respective non-galvanic signal transmission path of the coupling unit is preferably not interruptible from the outside. The coupling unit can, for example, be arranged in a housing and can be protected by the housing from influences interfering with the transmission from the outside.

The bus system preferably comprises a plurality of coupling units which are respectively adapted for the non-galvanic signal transmitted coupling of two sections of a respective bus signal path in the previously described manner. In this connection different coupling units can be associated with the same bus signal path, wherein the coupling units can be arranged at different positions of the bus signal path. Likewise different coupling units can be associated with different bus signal paths of the bus system and can respectively couple two sections of the respectively associated bus signal path in a non-galvanic manner.

The plurality of sections of a bus signal path coupled to one another via a coupling unit in a non-galvanic, but signal transmitting manner, as previously described, are preferably also otherwise separated from one another in a galvanic manner. The bus signal path comprising the sections separated in a galvanic manner sections still forms a continuous signal transmission path for the transmission of the bus signals, due to the signal transmitting coupling via the coupling unit. For a line-shaped bus signal path it can be sufficient for the galvanic separation of the sections of the bus signal path, when a coupling unit is present which divides the line-shaped bus signal path into two galvanically separate line sections. In the case of a ring-shaped bus signal path preferably at least two coupling units are provided at different positions of the ring-shaped bus signal path which coupling units divide the ring-shaped bus signal path into at least two galvanically separate ring sections.

The sensitivity of the bus system with respect to electromagnetic interferences can be further reduced through the galvanic separation of the sections of the bus signal path from one another, since galvanic interactions between the separate sections of the bus signal path are avoided. The bus system consequently has a high safety with regard to interferences and a high electromagnetic tolerance (EMT).

The bus system can also comprise a plurality of bus signal paths which respectively have a plurality of sections which are connected to one another in a signal transmitting and non-galvanic manner by one or more coupling units in the previously described manner and are preferably separated from one another in a galvanic manner.

A coupling unit can generally ensure a signal transmission in one direction or in both directions between the bus signal path sections. In this connection a transmission unit of the coupling unit is preferably associated with a section of the bus signal path which is connected to a section of the bus signal path in order to transmit the signals present at the section of the bus signal path to the other section. A reception unit of the coupling unit is preferably associated with the other section of the bus signal path which coupling unit is electrically conductively connected to the section of the bus signal path and is adapted to receive the signals transmitted by the transmission unit and to output these at the associated section of the bus signal path. Likewise, for example, the coupling unit can have both a transmission unit associated with the respective section and connecting this section and also a reception unit associated with this section or connected to this section or can have a combined transmission and reception unit associated and connected to the respective section in order to enable a signal transmission in both directions.

The coupling unit is preferably supplied with a current via the first and/or the second current supply lines of a segment or the first and/or the second current supply lines of a plurality of different sections in order to ensure the non-galvanic signal transmitting coupling of the sections of the bus signal path. In this connection a galvanic separation between the first and the second current supply lines of different sections can be maintained. In this connection a transmission unit, a reception unit or a combined transmission and reception unit which is/are associated with a section of the bus signal path can preferably be supplied with a current from the current supply unit of that segment which is associated with the respective section of the bus signal path, wherein the section of the bus signal path is preferably electrically conductively connected to one or more consumers and, in particular to all consumers of the associated segment. Thereby a galvanic separation between the sections of the bus signal path and the current supply lines can be realized in an advantageous manner in the region of a coupling unit.

A coupling unit can comprise, for example, an inductively coupled transmission and receiver pair, in particular a coil pair, a capacitively coupled transmission and receiver pair or an optically coupled transmission and receiver pair, such as, e.g. an optocoupler for carrying out the non-galvanic signal transmission, wherein respectively combined transmitters and receivers can also be used instead of pure transmitters and pure receivers.

In principle, it is preferred when two sections of the at least one bus signal path are coupled to one another via a coupling unit in a non-galvanic manner and are preferably separated from another in a galvanic manner are associated with different segments of the bus system and are connected to one or more consumers and preferably to all consumers of the respectively associated segment, preferably in an electrically conductive manner. The one or more consumers connected to the section of the bus signal path in an electrically conductive manner preferably represent participants of the bus system which influence the signals transmitted via the bus signal path and thereby transmits information generated by the respective participant via the bus signal path and/or receives and evaluates information transmitted via the bus signal path.

The bus system is preferably divided into a plurality of segments each having one or more consumers, wherein each segment is associated with one or more sections of at least one bus signal path separated from one another in a galvanic manner besides being associated with a first and a second current supply line, wherein each section of the bus signal path is preferably electrically conductively connected to one or more consumers and, in particular to all consumers of the associated segment in the previously described manner. Preferably both the first and the second current supply lines, as well as the at least one bus signal path section of a segment are separated from the first and the second current supply lines and from the at least one bus signal path section of a different segment in a galvanic manner. Thus, a complete galvanic separation of a plurality of segments, this means a galvanic separation of both the current supply lines associated with the different sections, as well as of the bus signal path sections from one another can be achieved, wherein the safety with regard to interferences of the system can be further increased and the design and implementation of the bus system is further simplified. The bus system can comprise two or more than two segments each having one or more consumers which are completely separated from one another in the previously described manner.

The bus line of the bus system preferably comprises a plurality of bus cables, wherein a bus cable is preferably respectively connected to two consumers of the bus system and is connected to the bus system. In this connection, the consumers and the bus cable, for example, form a ring topology or a line topology.

The first and the second current supply lines of a segment are preferably arranged in a common cable as at least sectionally separated and/or isolated electrically conductive conductors. Thereby the cabling demand required for the provision of the bus system is reduced.

The first and/or the second current supply lines of at least one segment can at least sectionally be arranged in the bus line. Preferably, the first and/or the second current supply line of the segment are arranged in a common bus cable at least sectionally together with the section of a bus signal path of the bus system, in that the first and/or the second current supply line and the bus signal path are realized, e.g. as electrically conductive conductors separate and/or isolated from one another. Thereby the required demand in cabling for the manufacture of the bus system is even further reduced.

In this connection the conductors of the bus cable can preferably be connected at a common plug connection element of the bus cable, this means a plug connector or a plug socket. The bus cable can also include the sections of a plurality of different bus signal paths or different sections of the same bus signal path which are preferably configured as conductors of the bus cable isolated from one another.

In accordance with an advantageous embodiment at least two and preferably all consumers of a segment are connected to the current supply unit associated with the segment via the first and/or the second current supply line of the segment in a row one after the other. The introduction of the current thus takes place at the beginning and/or at a start side end of a line formed by a plurality of consumers of this segment and, in particular by all consumers of this segment, with regard to this design, along which line the consumers are connected to the current supply unit via the first and/or the second current supply line. Preferably the segment is connected to a further segment via the segment start formed in this manner and a bus cable connected to the segment start.

When the current supply unit is arranged at the start and/or the start side end of such a line, the demand in effort and cost for the implementation of the bus system can be reduced. The introduction of the current into the segment can then take place via a consumer arranged at the end of the line and/or a feed module arranged there. In particular when a plurality of such line-shaped segments are connected to one another at their ends and are thereby connected behind one another at their ends, preferably via the bus line, the same consumer and/or the same feed module via which the introduction into the segment takes place can thereby also ensure the galvanic separation of the current supply lines of both segments in an advantageous manner, for example, in that the consumer and/or the feed module have terminals and/or plug connection elements for the first and/or the second current supply line of both segments which are separated from one another in a galvanic manner in the consumer and/or in the feed module. Thus, only one very specifically adapted consumer and/or a specifically adapted feed module is required in order to realize both the introduction of the current into a segment and also the galvanic separation between two adjacent segments, whereby the demand in effort and cost required for the implementation of the bus system is reduced.

The bus system preferably comprises a plurality of segments whose consumers are arranged in a line one after the other respectively with respect to their arrangement at the bus line, wherein the beginning and/or the start side end of a segment is connected to an end of the adjacent segment via the bus line. The arrangements required for the galvanic separation between the current supply lines of the segments can in this connection be arranged at the same start side end of a segment, as was previously described, at which end also the introduction of the current into the segment and the connection of the segment to the adjacent segment also takes place via the bus line, whereby the demand in effort and cost required for the implementation of the bus system and, in particular for the introduction of the current and the manufacture of the galvanic separation of the segments is reduced.

The bus system preferably comprises at least one feed module which is associated with one segment of the safety system and via which the associated current supply unit is connected to the segment for the provision of the electric voltage and, in particular is connected to one or more consumers of this segment of the bus system connected to the feed module. In this connection the feed module itself preferably represents a consumer of the segment which is, in particular connected to the bus line of the bus system. In principle the feed module can represent the single consumer of a segment having precisely one consumer. However, the segment preferably also comprises one or more further consumers in addition to the feed module which consumers are connected to the current supply unit via the feed module as previously described.

Preferably all consumers of the respective segment are connected to the current supply unit via the feed module. In this connection the feed module and the remaining consumers of the segment can be arranged in a row one after the other starting from the current supply unit with respect to their connection to the first and/or the second current supply line, as previously described, wherein the feed module can be present at the start side end of this line facing the current supply unit.

In accordance with an advantageous embodiment the feed module is connected to the first and to the second current supply lines of the segment of the bus system associated with the feed module and to the first and/or the second current supply lines of an adjacent segment of the bus system. The current supply lines of the segments can be separated from one another in a galvanic manner in the feed module in this respect. Due to the fact that the feed module is also connected to the first and/or to the second current supply lines of the adjacent segment a simplified incorporation of the feed module into the bus system and thereby a simplified cabling of the bus system is achieved. For example, the feed module can be connected to the adjacent segment via a bus cable which besides at least one conductor forming a section of the bus signal path of the system additionally includes a respective conductor for the first and/or the second current supply lines of the adjacent segment. In this way, no special cable is required for the connection between the feed module and the adjacent segment of the bus system via the bus line which cable has to be different from the remaining bus cables preferably used at a bus system for the connection of two consumers, since the cable can also include the conductors for the first and/or the second current supply lines. Thereby, the implementation of the bus system is simplified. At the same time a galvanic separation between the current supply lines of the segments adjacent to one another is ensured reliably through the feed module. When the feed module comprises at least one coupling unit, as is described in the following, the first and/or the second current supply line of the adjacent segment can moreover serve for the current supply of a transmission unit, of a receiver unit or of a combined transmission and receiver unit of the at least one coupling unit, wherein the galvanic separation between the current supply lines of the segments can be maintained. The current supply unit associated with the adjacent segment in this connection preferably provides a supply to a transmission and/or reception unit which is electrically conductively connected to a section of the bus signal path associated with the associated segment.

The feed module can, for example, comprise a first plug connection element, this means a plug connector or a plug socket to which a bus cable is connected which connects the feed module to the remaining consumers of the segment associated with the feed module, wherein the plug connection element preferably respectively has a connection for a conductor of the first and/or of the second current supply line of the associated segment and at least one connection for a conductor of a section of the bus signal path associated with this segment. The feed module can, moreover, comprise a second such plug connection element which connects the feed module to the one or more consumers of the adjacent segment and which preferably respectively has a connection for a conductor of the first and/or the second supply line of the adjacent segment and at least one connection for a conductor of the section of the bus signal path associated with the adjacent segment. The feed module additionally preferably comprises a third plug connection element for the connection of a cable, in particular a current supply cable, via which the feed module is connected to the associated current supply unit and in which the sections of the first and/or the second current supply line connecting the feed module to the associated current supply unit are arranged, wherein these sections can be configured as separate conductors of the cable.

The feed module preferably comprises at least one coupling unit, such as previously described, for the non-galvanic coupling of two sections of a bus signal path connected to the feed module. In this connection a section of the bus signal path is preferably electrically conductively connected to one or more consumers of the segment of the bus system associated with the feed module and the other section is preferably electrically conductively connected to one or more consumers of a segment adjacent thereto. The connection between the feed module and the consumers in this connection preferably takes place while the previously described bus cable is connected to the feed module.

The feed module preferably comprises a plurality of such coupling units which respectively couple two sections of a bus signal path to one another in a non-galvanic and signal-transmitting manner.

Consequently, the introduction of the current into a segment associated with the feed module and also the galvanic separation between the current supply lines of adjacent segments and the non-galvanic coupling of sections of a bus signal path can take place via the feed module. Thereby, it is enabled to provide a segmented bus system as previously described in a simple manner and with a low demand in effort and cost with both the current supply lines and the sections of the bus signal path, which are associated with different segments, being able to be completely separated from one another in a galvanic manner.

In principle, the bus system can comprise an arbitrary number of segments and, in particular also more than two segments as described herein and can comprise a plurality of feed modules which are respectively associated with a segment of the bus system and which can include the respective segment into the bus system in accordance with the foregoing description.

The bus system preferably comprises at least one electrical fuse arranged in the first current supply line of a segment and/or comprises at least one electrical fuse arranged in the second current supply line of a segment, preferably a current limiting electrical fuse, such as e.g. a safety fuse or a different overcurrent protecting fuse. Such a fuse can, for example, be arranged in a previously described feed module. Since the maximum current flow of a segment of the bus system only depends on the current consumption of the consumer associated with the segment, with a galvanic separation between the segments the fuse can be adapted to a small current value in comparison to the summed current consumption of all of the segments in an advantageous manner, which small current value can, for example, be slightly larger than the sum of the expected current consumption of all of the consumers of the respective segment in such a way that a simple, cost-effective and at the same time effective and secure electrical safe guarding is achieved.

The current supply unit of at least one segment of the bus system is preferably configured as a constant voltage source and is adapted to make available an at least substantially constant electric voltage in time. In this connection the current supply unit of a section can respectively make available one of two different electric potentials at two outputs separate from one another, wherein the voltage provided by the current supply unit is formed by the difference of these potentials. The voltages provided by the current supply units of the different segments and, in particular also the absolute potentials made available by the different current supply units, with the potentials forming these voltages, are preferably at least substantially identical. The provided voltage can, for example, amount to at least approximately constantly 24 volts, wherein a ground potential is, for example, made available at an output of a current supply unit and the other output of the current supply unit makes available a voltage of 24 volts with respect to the ground potential. A current supply unit is preferably configured as a power supply, e.g. as a switching power supply and can be connected, for example, to a superordinate alternating current supply grid for its own power supply and current supply.

The bus system can, for example, be a field bus system which comprises a plurality of locally distributed and arranged consumers. The spacing between two different consumers can in this connection be considerable and can, e.g. amount to one or more meters. Different consumers of the bus system are preferably arranged in different housings separate from one another, wherein a housing is preferably configured in accordance with the housing protective type IP 67 or IP 20 or of a housing protective type otherwise protecting against contamination or humidity. A bus cable preferably extends outside of the housing and is preferably a suitable and allowable standard sensor/actor cable suitable for the laying outside of housings and protecting against contamination or humidity, for example of the type M12, having a core cross-section and/or conductor cross-section of preferably at least 0.34 mm². The connections between the cables and/or the bus cables and the consumer and/or the current supply units and the feed modules are preferably realized by plug connections. In accordance with the spacings between the consumers a bus cable can have a length of e.g. one or more meters.

In accordance with an advantageous embodiment the bus system is a safety system which can be used for recognizing a hazardous situation at a safety critical plant or machine and can be used for carrying out a safety related cutoff in the hazardous situation.

A safety system of this kind can comprise a safety control having an output and an input, in particular a safety input to which the bus line of the bus system is connected, and has a plurality of safety related participants connected to the bus line. The safety control and/or the safety related participants in this connection preferably form consumers of the bus system which are supplied with a current by the current supply units of the bus system. In this connection the safety related participants are preferably arranged locally distributed at the plant to be monitored.

Such a safety system preferably has a test signal path as a bus signal path which forms a closed ring between the output and the input of the safety control and is configured for the transmission of a preferably dynamic output signal and/or test signal, this means a test signal changeable in time. The safety related participants are preferably included in and adapted to the test signal path through their connection to the bus line such that the presence of a non-secure state of the protective device respectively associated with the safety related participant leads to an interruption of the test signal path.

For example, a secure protective device can be provided as a protective device which is configured to take on a secure or a non-secure state in dependence on an outer influence relevant for the safety of, e.g. a person. For example, it can be an emergency cutoff switch which comprises one or more e.g. mechanical switching contacts which in the secure state, this means the non-actuated state, of the emergency cutoff switch are closed and which in the non-secure state, this means the actuated state, of the emergency cutoff switch are open. A further example is a locking apparatus of a safety door which comprises one or more, in particular magnetically controlled switching contacts which are closed in the secure position of the door, this means the locked position of the door and which are open in the non-secure position of the door, this means the open position of the door. Further examples of a protective device are a light barrier, a light grid or a laser scanner which, for example, take on a secure state for a free light path and for a non-free light path take on a non-secure state.

In this connection the safety related participants of the bus system are preferably adapted, as previously described, in such a way that the presence of a non-secure state of the associated protective device leads to an interruption of the test signal path. For this purpose, for example, a switch closed in the secure state and open in the non-secure state of a protective device, e.g. configured as an emergency cutoff switch or as a locking apparatus for a safety door, can be serially included in the test signal path and can be used by this as a direct signal transmission path in such a way that an opening of the switch leads to a direct interruption of the test signal path. In a similar manner a light barrier interrupted in a non-secure state and/or a transmission path formed by a light transmitter and a light receiver, as a direct transmission path of the test signal path interrupted in a non-secure state can be serially included in the test signal path. Likewise it is possible that the secure and the non-secure state of the protective device are respectively imaged, e.g. by an electronic image onto a closed and onto an open state of a switch which is serially included into the test signal path, preferably an electronic switch, in order to close the test signal path in the secure state of the protective device and to interrupt the test signal path in the non-secure state of the protective device.

The safety control transmits a preferably dynamic output signal or test signal to the test signal path at its output and monitors whether a test signal incoming at the safety input corresponds to an expectation stored in the safety control with respect to the incoming test signal. For example, the safety control can monitor whether the incoming test signal has a synchronicity with respect to the transmitted output signal and/or test signal and/or has periodic test gaps arising at an expected periodicity and having a preferably predefinable length. If the test signal remains absent at the safety input of the safety control and/or if an incoming test signal is received which does not correspond to the expectation, the safety control can assume that a safety related participant is not present in the secure state or that an error is present in the bus system and thereupon can carry out a safety related cutoff of the monitored plant or can carry out a different safety related measure at the monitored plant which safety related measure represents the desired safety function of the bus system.

The plurality of safety related participants included in the test signal path and connected to one another in a row in the test signal path as described in the foregoing form a cascade to be run through by the output signal and/or test signal in such a way that a non-secure state of the protective device of an arbitrary safety related participant leads to an interruption of the test signal path and thereby to the absence of the expected test signal at the safety control. The test signal received at the safety input thus represents a safety information and/or a summed information on the state of all safety related participants, since a test signal corresponding to the expectation can only arrive at the safety control when the test signal path is not interrupted, this means when all protective devices are present in their secure state. Thus, a monitoring based on a plurality of protective devices of a plant can be achieved with a low demand in cabling through the cascading and serial inclusion of the safety related participants into the common test signal path which cabling demand merely requires the allocation of a single output and of a single safety input of the safety control in the simplest case.

In accordance with an advantageous embodiment of the previously described safety system a plurality of the safety related participants and preferably all safety related participants of the system are arranged along the bus line in a row in such a way that both the forward path and the return path of the test signal path run through the same safety related participants. The safety system moreover preferably has a termination element arranged at the end of the line which connects the forward path and the return path of the test signal path. The safety control is configured to transmit an output signal at its output connected to the forward path. The termination element is configured to receive the output signal from the forward path and to output a test signal to the return path of the test signal path in dependence on the output signal received from the forward path, said test signal being changed with respect to the received output signal.

Thus, the forward path and the feedback path of the test signal path run through the same safety related participants for this design. Thereby a line topology of the bus line and of the safety related participants connected to the bus line is realized. The required demand in cabling is thereby reduced with respect to a ring topology of the bus line, since it is not necessary to route the forward path and the return path of the test signal path in separate cables. Rather more, these can be guided at least sectionally in a common bus cable from one safety related participant to the next.

The termination element preferably arranged at the end of the line and the change and/or conversion of the output signal received from the forward path and carried out by the termination element on the generation of the test signal output to the return path in this connection, in particular serves the purpose of recognizing a cross circuit between the forward path and the return path of the test signal path. The expectation with respect to which the safety control monitors the test signal received at the safety input is in this connection preferably configured in such a way that the satisfaction of the expectation presupposes the signal change and/or signal conversion carried out by the termination element. A bridging of the termination element as a consequence of the cross-section between the forward path and the return path of the test signal path then leads to a violation of the expectation and thus to an activation of the safety function, for example, when as a consequence of a cross-circuit an incoming test signal is received unchanged with respect to the output signal transmitted by the safety control. Thus, albeit the line topology and the in this connection inherent possibility of a cross-circuit between the forward path and the return path of the test signal path a high safety level is achieved for a low demand in cabling. The termination element advantageously likewise represents a consumer of electric power of the bus system. In this connection the termination element can be connected to the adjacent safety related participant via a direct plug connection or a bus cable.

The safety control can moreover be configured to generate data and to transmit data to the safety related participants and/or the termination element which receive and evaluate the data. Likewise the termination element and/or the safety related participants can be adapted to generate data and to transmit this to the safety control which receives and evaluates the data. For this purpose the safety system preferably comprises a data path commonly used by the safety related participants and the termination element, wherein the safety related participants and the termination element are preferably connected in a row one after the other for the reception and/or transmission of data to and from the data path and are connected to this. The data path can be configured as a ring-shaped data path arranged between an output and an input of the safety control, the data path having a data forward path running between the safety control and the termination element and a data return path running from the termination element to the safety control. In this connection, the safety control preferably transmits data via the data forward path to the termination element and/or to the safety related participants and the termination element and/or the safety related participants preferably transmit data via the data return path to the safety control. In this connection the data forward path is preferably formed by the forward path of the test signal path this means it is identical to this. The output signal transmitted by the safety control to the forward path of the test signal path can in this connection include data features which represent output data transmitted by the safety control to the safety related participants and/or to the termination element. The data return path can be configured as a separate signal path and/or bus signal path. The forward path and the data return path of the data path can in this connection run through the same safety related participants, this means that the bus system also has a line topology with the corresponding low demand in cabling with respect to the data path.

The previously described safety system and its safety functions preferably satisfy the safety level SIL 3 in accordance with the norm IEC 61508 and/or the safety level performance level e ("PL e") in accordance with the norm EN ISO 13849-1. The safety input of the safety control preferably comprises a secure input. The secure input is characterized by an error-safe evaluation of the signal incoming into the safety control, for which purpose, for example, a two-channeled evaluation can take place which is e.g. carried out by two parallel working redundant microprocessors which control one another.

The invention further also relates to a feed module in accordance with claim 13 which is configured for the use in the herein described bus system in accordance with the invention. The advantageous embodiments of the feed module described herein with reference to the bus system in accordance with the invention and the corresponding advantages are correspondingly true.

The feed module in accordance with the invention comprises
- a first plug connection element having a first and a second connection for the connection respectively to a supply side section of a first and a second current supply line of a segment of the bus system associated with the feed module and a current supply unit connected thereto;
- a second plug connection element having a first and a second connection for the connection respectively to a consumer side section of the first and the second current supply line and to at least a third connection for the connection to a section of at least one bus signal path associated with the segment;
- wherein the first and the second connections of the first and the second plug connection element are connected to one another in an electrically conductive manner;
- a third plug connection element having a first and a second connection for the connection to a respective first and second current supply line of an adjacent segment of the bus system and to at least one third connection for the connection to at least one bus signal path associated with the adjacent segment of the bus system;
- wherein the first and the second connections of the third plug connection element are respectively separated from the first and the second connections of the first and the second plug connection elements in a galvanic manner; and further comprising
- at least one coupling unit for the signal transmitting non-galvanic coupling of the at least one third connection of the second plug connection element to the at least one third connection of the third plug connection element.

In the following the invention will be described purely by way of example with reference to advantageous embodiments and by means of the submitted drawings. There is shown.

Figure 1:
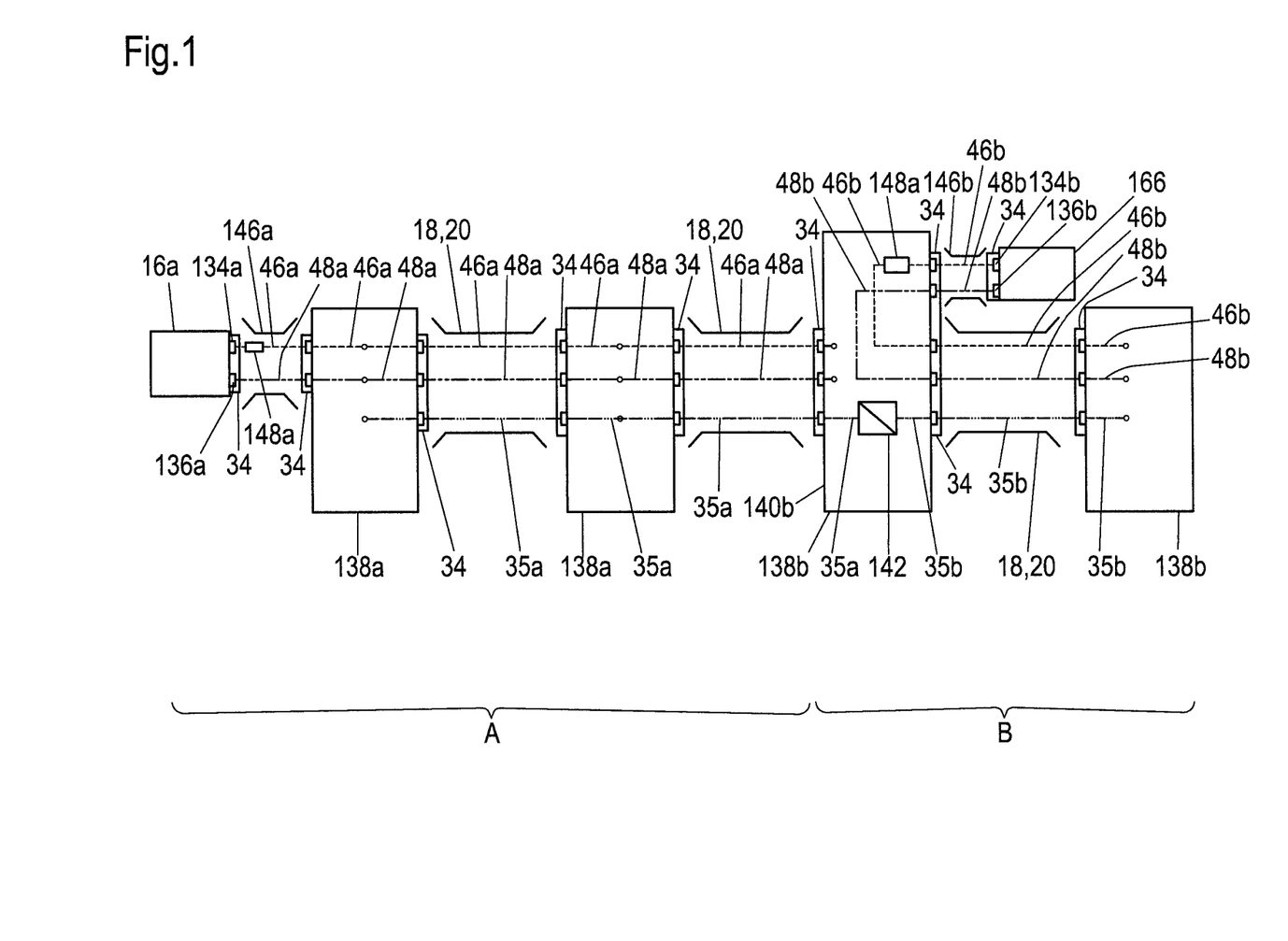
FIG. 1 a bus system in accordance with an embodiment of the invention.

FIG. 1 shows a bus system in accordance with an embodiment of the invention. The bus system comprises a bus line 18 which is formed by a plurality of bus cables 20, two separate electrical current supply units 16a, 16b respectively configured as a power supply and, in particular as a switching power supply, as well as a plurality of consumers 138a, 138b of electrical power which are connected to one another via the bus line 18.

A cable is illustrated in the Figures in principle by two respective brackets facing one another which represent the jacket of the cable, wherein generally one of the brackets is provided with the corresponding reference numeral, this means the reference numeral 20 for a bus cable, the reference numeral 28 for an interconnection cable described in the following or one of the reference numerals 146a, 146b, 146c for an electric cable. The lines respectively drawn in between the brackets of a cable respectively represent an electrical line arranged in the respective cable which can be composed of one or more electrical line conductors arranged in the cable jacket.

The bus system shown in FIG. 1 is divided into two segments A and B with respect to its current supply which segments each have two consumers 138a, 138b of electrical power, with the consumer 138a and the current supply unit 16a being associated with the segment A and with the consumer 138b and the current supply unit 116b being associated with the segment B. The consumer 138b of the segment B illustrated on the left hand side in FIG. 1 in this connection forms a feed module 140b explained in detail in the following. The bus system could, however, also comprise more than two segments A, B in the scope of the invention and/or a plurality of feed modules 140b which are associated with different segments A, B. The current supply unit 16a, 16b respectively makes available a first direct voltage potential, of e.g. 24 Volts with respect to ground, at a first connection 134a, 134b and a second direct voltage potential, of e.g. 0 Volts and/or ground potential, at a second connection 136a, 136b. In principle, the bus system could also be divided into more than two of the previously described segments A, B each having one or more consumers 138a, 138b.

The two adjacent segments A, B respectively have a first current supply line 46a, 46b for the first electric potential and a second current supply line 48a, 48b for the second electric potential via which the consumers 134a, 134b of the respective segment A, B are respectively electrically conductively connected to the corresponding first and/or second connection 138a, 138b, 136a, 136b of the associated current supply unit 16a, 16b. The consumers 138a, 138b are supplied with an electric current thereby. The consumers 138a, 138b are thereby in a position in which they can satisfy the functions required for the operation of the bus system and, in particular so that they can participate with the exchange of information between the consumers 138a, 138b intended by the bus system and to in this way carry out the operations associated therewith. The electricity consuming electrical and/or electronic elements of the consumers 138a, 138b provided for this purpose and their connections to the current supply lines 46a, 46b, 48a, 48b are not separately shown in FIG. 1. These elements can, for example, comprise a microprocessor or a similar signal processing and/or electrical or electronic components suitable for transmission.

The first and the second current supply lines 46a, 48a of the segment A are in this connection separated from the first and the second current supply line 46b, 48b of the segment B in a galvanic manner.

The first segment A is connected to the current supply unit 16a via the consumer 138a illustrated on the left hand side in FIG. 1 and via a cable 146a connected to this. The segment B is connected to the current supply unit 16b via the feed module 140b and via a cable 146b connected to this.

The feed module 140b connects the segment B to the associated current supply unit 16b via the cable 146b as well as to the consumers 138a of the adjacent segment A via a bus cable 20. In this connection the feed module 140b is not only connected to the first and to the second current supply lines 46b, 48b of the segment B, but rather also to the first and the second current supply lines 46a, 48a of the segment A, wherein the current supply lines 46a, 48a, 46b, 48b of the different segments A, B are separated from one another in a galvanic manner in the feed module 140b. The connection between the feed module 140b and the consumer 138a of the segment A illustrated on the right hand side of FIG. 1 is in this connection, like the remaining connections between two consumers 138a, 138b, formed by a bus cable 20 having a respective conductor for the formation of the respective first and second current supply lines 46a, 48a and a conductor for the formation of a section 35a of the subsequently described bus signal path composed of the sections 35a and 35b. The current supply lines 46a, 48a of the segment A end in the feed module 140b where they are connected to the coupling unit 142, as will be described in the following, wherein the corresponding connections are, however, not illustrated in the illustration of FIG. 1.

The bus system comprises a bus signal path which is composed of two galvanically separate sections 35a, 35b, wherein the section 35a is associated with the segment A and is electrically conductively connected to the consumers 138a of the segment A and wherein the section 35b is associated with the segment B and is electrically conductively connected to the consumers 138b of the segment B. The feed module 140b comprises a coupling unit 142 which is configured for the non-galvanic signal transmitting coupling of the two bus signal path sections 35a, 35b in order to form a continuous signal transmitting bus signal path between all consumers 138a, 138b. The consumers 138a, 138b are respectively connected to the associated sections 35a, 35b of the bus signal path and are adapted to take part with the communication via the bus signal path 35a, 35b, this means to generate information and to transmit this via the bus signal path 35a, 35b and/or to receive and to evaluate information transmitted via the bus signal 35a, 35b. The elements of the consumers 138a, 138b provided for the corresponding signal generation and signal processing are not separately shown in FIG. 1, the elements are preferably supplied with a current via the current supply lines 46a, 46b, 48a, 48b.

The coupling unit 142 for the non-galvanic signal transmission between the sections 35a, 35b of the bus signal path in the present embodiment comprises a combined transmission and reception unit which is electrically conductively connected to the section 35a and a combined transmission and reception unit which is electrically conductively connected to the section 35b. A transmission and reception unit can, for example, comprise a transmission and reception coil of an inductive signal transmission path or an optical transmitter and an optical receiver of e.g. a multi-channeled optocoupler. The transmission and reception unit electrically conductively connected to the section 35a is in this connection supplied with a current via the current supply lines 46a, 48a of the segment A and the transmission and reception unit electrically conductively connected to the section 35b is supplied with a current via the current supply lines 46b, 48b of the segment B, wherein the galvanic separation between the current supply lines 46a, 46b, 48a, 48b of the segments A and B can be maintained.

The feed module 140b, the remaining consumers 138a, 138b and the current supply units 16a, 16b each have plug connectors or plug sockets via which they can be connected for the formation of a plug connection 34 using corresponding plug connection elements of the bus cables 20 and/or cables 146a, 146, whereby the electrical connection to the line conductors included in the bus cables 20 and/or cables 146a, 146b is produced.

An electrical fuse 148a, 148b is respectively arranged in the current supply lines 46a and 46b, wherein the electrical fuse 148a is arranged in the cable 146a connected to the current supply unit 16a and the electrical fuse 148b is arranged in the feed module 140b. The fuses 148a, 148b can be current limiting fuses, such as e.g. safety fuses or different over current protecting fuses.

Through the segmentation of the bus system with respect to the energy supply and through the galvanic separation between the current supply lines 46a, 46b, 48a, 48b and the sections of the bus signal path sections 35a, 35b of the segments A and B, the electromagnetic tolerance (EMT) of the bus system is considerably increased. Moreover, the current loading with regard to which the components of the bus system have to be designed is reduced in such a way that the safety concept of the bus system is simplified and the complexity of the bus system is reduced. At the same time the segmented bus system can be planned and implemented very simply in that a feed module 140b, as described in the foregoing, having a corresponding current supply unit 16a, 16b is used at suitable positions between two segments A and B to be generated separated from one another in a galvanic manner. With respect to the design of the current supply unit 16a, 16b and the fuses 148a, 148b, etc. in this connection only the maximum current consumption of the consumers 138a, 138b of the respectively associated segment A, B and the line lengths in the same segments A, B have to be considered.

Figure 2:
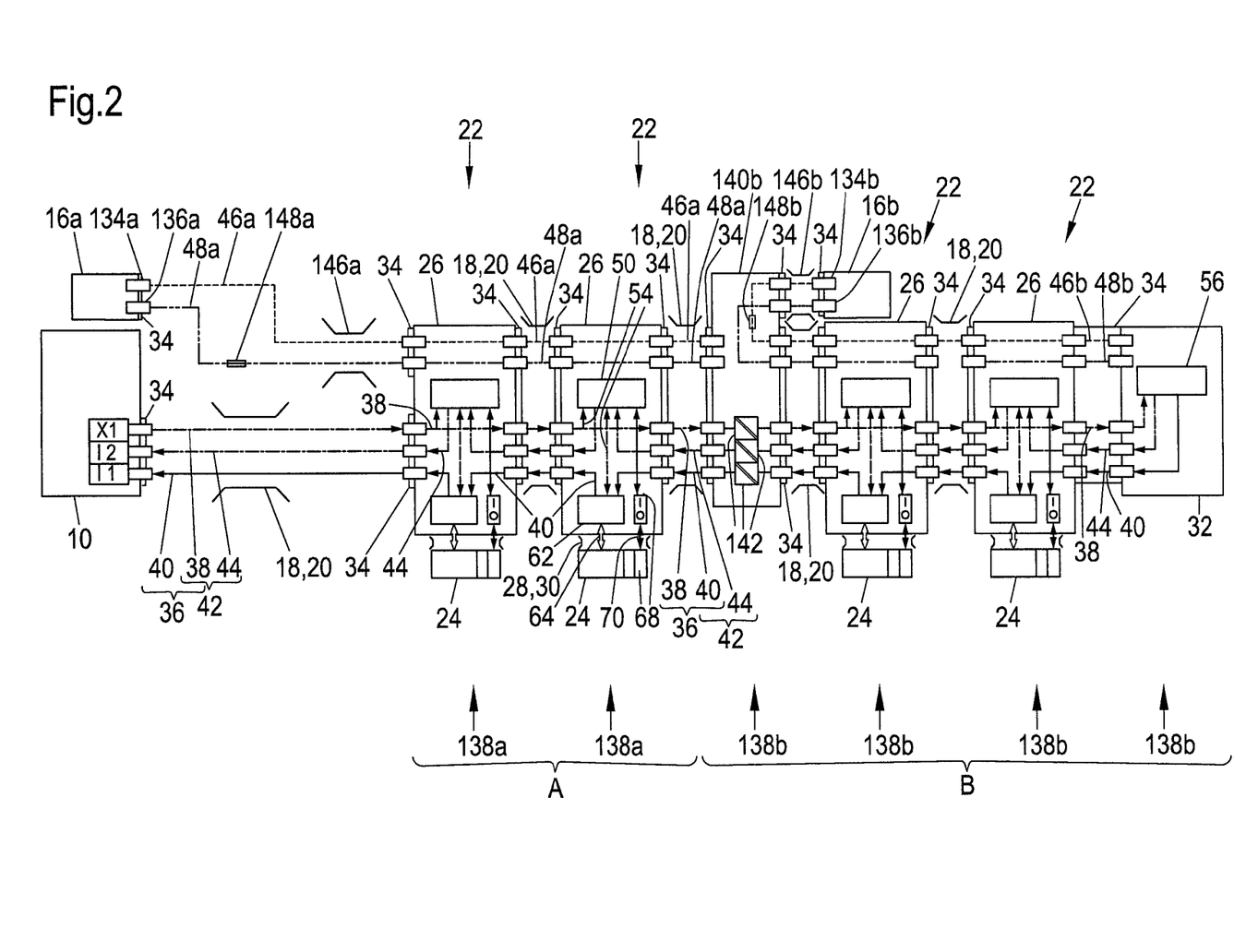
FIG. 2 a bus system in accordance with a further embodiment of the invention.

FIG. 2 shows a bus system in accordance with a further embodiment of the invention which is configured as a safety system. A safety system substantially corresponds to the bus system shown in FIG. 1 having the following additionally described features. In the following the general assembly of the safety system and its manner of function will initially be explained, wherein the electrical supply of energy of the bus system will subsequently be described in detail.

The safety system comprises a safety control 10 which can be arranged in a switching cabinet and has an output X1, has a safety input I1 and has a non-secure standard input I2. Furthermore, two separate current supply units 16a, 16b are provided for the current supply of the safety system.

The safety system comprises a bus line 18 having a plurality of bus cables 20, wherein one of the bus cables 20 is connected to the safety control 10. The safety system further comprises a plurality of safety related participants 22 which are connected in a row one after the other via the bus cable 20 and are connected to the safety control 10 via the bus line 18. A feed module 140 is further provided which will be explained in more detail in the following. The safety system is configured as a field bus system, this means that the components of the safety system are arranged locally distributed, in particular the safety related participants 22 and possibly the feed module 140b.

The safety related participants 22 will be described in the following, wherein the reference numerals relating to components of the safety related participants 22 will not be shown for all safety related participants 22 in FIG. 2 for reasons of clarity, but are only partly indicated for the second safety related participant 22 from the left. The safety related participants 22 respectively comprise a protective device 24 and an interconnection module 26 which is connected to the respective protective device 24 via an interconnection line 30 formed by an interconnection cable 28 and which is directly connected to the respectively adjacent bus cable 20.

A termination element 32 is present at the end of a line formed by the safety related participants 22 which in the present example is directly connected to the last safety related participant 22 of the line, this means without a cable switched therebetween. In principle, the termination element 32 could, however, be connected to the corresponding safety related participant 22 via a further bus cable.

The bus line 18 and the safety related participants 22 connected to the bus line 18 as well as the feed module 140b form a ring-shaped test signal path having a forward path 38 connected to the output X1 of the safety control 10 and a return path 40 connected to the safety input I1 of the safety control 10, wherein the forward path 38 and the return path 40 are connected to one another via the termination element 32 and both the forward path 38 and the return path 40 run through the safety related participants 22 and the feed module 140b. The safety related participants 22, the bus line 18, the termination element 32 and the feed module 140b further form a data path 42 which comprises a data forward path formed by the forward path 38 of the test signal path 36, this means it is identical to this, and a separate data return path 44 connected to the input I2 of the safety control, which together form a ring bus line. The forward path 38 and the return path 40 of the test signal path 36 and the return path 44 of the data path 42 respectively form a bus signal path of the bus system.

For reasons of clarity not all individual arrow lines illustrating the bus signal paths 38, 40, 44 are individually provided with reference numerals in FIG. 2. However, all arrow lines which run at least sectionally along the straight in parallel to the image horizontal in FIG. 2 respectively belong to the same bus signal path 38, 40, 44, this means the arrow lines having a section running in parallel to the image horizontal at the height of the output X1 belong to the forward path 38 of the test signal path 36, the arrow lines having a section running in parallel to the image horizontal at the height of the input I2 belong to the return path 44 of the data path 42 and the arrow lines having a section running in parallel to the image horizontal at the height of the safety input I1 belong to the return path 40 of the test signal path 36.

The feed module 140b has three coupling units 142 to which respectively two sections of one of the bus signal path 38, 40, 44 are coupled in a non-galvanic manner.

The current supply lines 46a, 48a, 46b, 48b are provided besides the bus signal path 38, 40, 44 via which the safety control 10, the safety related participants 22, the termination element 32 and the feed module 140b are supplied with a current. The interconnection cables 28 can respectively comprise a first and a second current supply conductor not illustrated in FIG. 2 via which the respective protective device 24 can be connected to a respective first and second current supply line 46a, 48a, 46b, 48b and can thereby be supplied with a current.

The test signal path 36, the data path 42, the first current supply line 46a and/or 46b and the second current supply line 48a and/or 48b are respectively arranged between the safety related participants 22 in the bus line 18 and are routed in the same common bus cable 20 of the bus line 18 as shown in FIG. 2. In this connection the bus cables 20 respectively have an electrically conductive conductor for the forward path 38 of the test signal path 36 which simultaneously represents the data forward path, for the data return path 44, for the first current supply line 46a and/or 46b and for the second current supply line 48a, 48b in such a way that the cabling of the safety related participants 22 and the feed module 140b to one another is realized by a line-shaped bus line 18 composed of bus cables 20 each having at least five conductors. Thus, only one bus cable 20 is required in order to connect two adjacent safety related participants 22 to one another and/or to the feed module 140b. The direct connection of the safety related participants 22 to the safety control 10 is carried out via a bus cable 20 having three conductors for the embodiment shown in FIG. 2.

In the following the functional principle of the safety system of FIG. 2 will be explained:

An output signal is generated by the safety control 10 and is transmitted via the output X1 to the forward path 38. This output signal is transmitted to the termination element substantially unchanged. In this connection the output signal runs through the interconnection modules 26 of the safety related participants 22, as is visible in FIG. 2, through which the output signal is respectively directly looped through substantially unchanged and without the possibility of interruption as well as through the feed module 140b which transmits the output signal via the associated coupling unit 142 substantially unchanged in a non-galvanic manner and forwards this to the next safety related participant 22 in the line. At the same time a logic unit 50 (see the second safety related participant 22 from the left in FIG. 2) having a microprocessor is respectively provided in the interconnection modules 26 which is connected to the forward path 38 via a signal path 54 and is adapted to monitor the output signal transmitted via the forward path 38, for example, for the purpose of a synchronization.

The output signal generated by the safety control and transmitted via the forward path 38 is based e.g. on an electric voltage and has periodically arising synchronization features at a predefined cycling time and has data features arranged between the synchronization features in a timewise manner which respectively represent a data bit of the output data which is transmitted by the safety control 10 to the safety related participants 22 and to the termination element 32.

The termination element 32 is adapted to receive the output signal from the forward path 38 and to transmit a test signal to the return path 40 of the test signal path 36 in dependence on the output signal received by the forward path 38, said test signal being changed with respect to the received output signal. The test signal transmitted via the return path 40 thus differs from the output signal transmitted by the safety control 10. The termination element 32 is preferably adapted to transmit a test signal which is synchronized to the presence of the synchronization features in the output signal of the safety control 10 and for this purpose monitors the presence of the synchronization features in the received output signal. For example, the test signal can have a high signal level with periodically arising test gaps having a low level, in particular arising with the cycling time of the output signal, wherein the test gaps in the test signal are preferably synchronized to the synchronization features in the output signal. The difference between the output signal generated by the safety control 10 and the test signal generated by the termination element 32 preferably comprises the fact that the test signal does not have the data features present in the output signal. The data features present in the output signal can thus not only serve for the simultaneous transmission of data in addition to the synchronization features via the common forward path 38, but also for the capability of differentiating between the output signal transmitted by the safety control 10 and the test signal generated by the termination element 32.

The termination element 32 has a logic unit 56 having a microprocessor connected to the forward path 38 for carrying out the aforementioned operations which logic unit receives and evaluates the output signal transmitted via the forward path 38. The logic unit 56 is connected to a test signal generator of the termination element 32 not separately illustrated in FIG. 2 and controls this in order to actively generate the test signal and to transmit this to the return path 40 of the test signal path 36 connected to the test signal generator in a signal driving manner. In order to carry out the synchronization between the output signal and the test signal, the termination element 32 can use an own time base present in the termination element 32 which is independent of the received output signal, for example, a clock generator of the microprocessor of the logic unit 56.

The return path 40 of the test signal path 36 runs through the safety related participants 22. These are adapted to interrupt the return path 40 on the presence and/or occurrence of a non-secure state of their respective protective device 24. For this purpose the interconnection modules 26 respectively have a test circuit 62 (as is indicated in the second safety related participant 22 from the left in FIG. 2) which is connected to the respective protective device 24 via connections 64 of the interconnection line 30, wherein the test circuit 62 brings about an interruption of the return path 40 of the test signal path 36 on the presence of a non-secure state of the protective device 24 in cooperation with the protective device 24.

The protective device 24 can, for example, comprise a signal transmission path which is interrupted on the appearance of a non-secure state of the protective device 24. The protective device can, for example, be an emergency cutoff switch having at least one mechanically actuatable electrical switch actuatable via a button of the emergency cutoff switch, in particular an opener, which is closed in the secure state of the emergency cutoff switch, this means in the non-actuated state of the emergency cutoff switch and is open in the non-secure state of the emergency cutoff switch, this means in the actuated state of the emergency cutoff switch. A further example is a locking apparatus for a protective door which at least comprises an e.g. magnetically actuatable switch which is closed for a closed protective door and is open for an opened protective door. Likewise, the protective device 24 can comprise a light barrier having an optical signal transmission path which runs through a spatial region to be monitored and in the secure state, this means in a free spatial region, ensures a signal transmission. On the occurrence of a non-secure state, this means on the entrance of an object into the monitored spatial region, the optical transmission path is automatically interrupted.

In the aforementioned cases the at least one interruptible signal transmission path, this means the electrical switch and/or the optical signal transmission path, is preferably directly serially included into the return path 40 of the test signal path 36 and is used as a direct transmission path for the test signal in such a way that the occurrence of a non-secure state and the in this way inherent interruption of the signal transmission path directly signifies an interruption of the test signal path 36. The connection 64 between the test circuit 62 and the protective device 24 arranged in the interconnection line 30 can in this connection comprise a forward line and a return line by means of which the respective interruptible signal transmission path is directly serially included in the return path 40. In this connection, the test signal 62 can in the simplest case be composed solely of the electrically conductive inclusion of the forward line and the return line into test signal path 36. A protective device 24 can also comprise a plurality of such interruptible signal transmission paths, in particular switches, which are preferably switched and/or interrupted in common or equivalently and are preferably connected in series with respect to one another in the test signal path 36.

A protective device 24 can also have a, preferably digital, switching signal output at which the protective device 24 outputs a switching signal which indicates and/or represents the state "secure" or "non-secure" of the protective device 24, for example an OSSD switching signal output (output signal switching device). In this case the secure and the non-secure state of the protective device 24 are preferably imaged by an electrical or electronic conversion and/or imaging onto a closed and/or open state of an electrical or electronic switch, in particular of a field effect transistor, which is connected in series in the return path 40 of the test signal path 36 and in this way can interrupt this. The connection 64 of the interconnection line 30 can then comprise a switching signal line which is connected to the switching signal output of the protective device 24 and transmits its switching signal to the test circuit 62. The test circuit 62 can comprise the previously described electrical or electronic switch included in the test signal path 36 and open and close this in dependence on the switching signal of the protective device 24 in the previously described manner.

The safety control 10 is adapted to receive the signal transmitted via the return path 40 of the test signal path at the safety input I1 and to compare this to an expectation configured in the safety control 10. In this connection, the safety control 10 checks, for example, whether a respective test gap having the expected duration is received at the expected intervals and at the expected point in time, this means in synchronization to the output synchronization features. If the received signal does not correspond to this expectation, then this allows a conclusion to be drawn on a non-secure state of at least one protective device 24 or on a functional error of the safety system and the safety control 10 induces a suitable safety related measure, e.g. a safety related cutoff of a monitored plant through the interruption of the current supply to this plant.

Since the test signal transmitted via the return path 40 during the operation of the safety system differs from the output signal transmitted via the forward path 38 and only the test signal corresponds to the expectation of the safety control 10 an e.g. cross-circuit between the forward path 38 and the return path 40 of the test signal path 36 leads to an absence of the expected signal at the safety input I1. Such a functional error, which can, for example, emerge on a squashing of a bus cable 20, thus reliably leads to a violation of the expectation of the safety control 10 and to a safety related cutoff in such a way that a tolerance of such a state of error is excluded by the safety control 10.

The logic units 56, 50 of the termination element 32 and of the interconnection modules 26 are respectively arranged in the data path 42 and/or in the data return path 44 and are adapted to receive data via the data path 42 as is described in detail in the following manner and to transmit this to the data return path 44. The data generated by the safety related participants 22 and transmitted via the data return path 44 preferably comprises diagnostic and/or status information generated by the respective safety related participant 22.

This information can, in particular state the safety relevant switching state of the respective protective device 24 which is also decisive for the interruption of the test signal path, this means for the state "secure" or "non-secure" taken on by the protective device. Thereby the safety control 10 is in a position to determine which safety related participant 22 caused the cutoff in the case of a triggering of a safety related cutoff.

The interconnection modules 26 respectively comprise an input/output interface 68 connected to the logic unit 50 via a signal path 54, in particular a binary input/output interface 68 (see the second safety related participant 22 from the left of FIG. 2) which is connected to an input/output interface 68 of the protective device, in particular binary and/or non-secure input/output interface 68 of the protective device, via at least one signal conductor 70 provided in the interconnection line 30 in order to transmit data received via the data return path 44 to the protective device 24 and/or to transmit data generated by the protective device 24 to the safety control 10 via the data return path 44.

The output data transmitted with the output signal of the safety control 10 is received by the termination element 32 and the safety related participants 22 and can, for example, comprise control data for the control of functions of the safety related participants 22 and/or their protective devices 24, such as e.g. a command of a locking function of a protective device 24 configured as a locking apparatus of a protective door.

The forward path 38 of the test signal path 36 connected to the output X1 together with the data return path 44 connected at the input I2 forms a ring-shaped data path 42 configured as a ring bus via which the safety control 10, the termination element 32 and the safety related participants 22 communicate with one another and indeed in accordance with a daisy-chain type bus communication described in the following. The safety control 10, the termination element 32 and the safety related participants 22 in this connection form the participants of the bus communication, with the safety control 10 at the same time representing the bus master.

The safety control 10 transmits the output signal including the output data generated by the safety control 10 at its output X1 to the forward path 38 and receives the data signal transmitted via the return path 44 of the data path 42 at its input I2, said data signal including the data generated by the safety related participants 22 and/or the termination element 32 which is received and evaluated by the safety control 10. In order to receive data from the data path 42 and to transmit data via the data path 42 each participant 22, 32 is configured to receive an incoming data signal transmitted via the data path 42 at its input, to process the received data and to preferably at the same time transmit an outgoing data signal to the data path 42 at an output different from the input in such a way that the participants 22, 32 form a communication chain in which the data is transmitted from one participant 22, 32, to the next in a predefined data flow direction. The logic units 50, 56 of the safety related participants 22 and the termination element 32 in this connection serve as a transmission and reception circuit via which the respective participants 22, 32 receive and transmit data.

The safety system shown in FIG. 2 is divided into two segments A and B with regard to its current supply in the manner as previously described with reference to FIG. 1 which segments respectively comprise a plurality of consumers 138a, 138b of electrical power which in the present embodiment are formed by the safety related participants 22, the termination element 38 and the feed module 140b. The consumers 138b of the segment B are formed by the feed module 140b, the two safety related participants 22 illustrated on the right hand side in FIG. 2 and the termination element 32.

The consumers 138a of the segment A are formed by the two safety related participants 22 illustrated on the left hand side in FIG. 2, wherein the left safety related participant 22 directly connected to the safety control 10 of the segment A is directly connected to the current supply unit 16a without a feed module 140b being switched therebetween.

The bus signal path, this means the forward path 38 and the return 40 of the test signal path 36, as well as the data return path 44 are respectively divided into two sections, wherein each section is respectively associated with one segment A, B and is electrically conductively connected to the consumers 138a, 138b of the respective segment A, B. The separate sections of the bus signal path 38, 40, 44 are respectively coupled to one another by a coupling unit 142 arranged in the feed module 140b in a non-galvanic manner, in particular in an optical, inductive or capacitive manner. In this connection a galvanic separation and at the same time a continuous signal transmitting connection is realized between the sections of the bus signal paths 38, 40, 44 associated with the different segments A, B. Each coupling unit 142 can, for example, comprise a combined transmission and reception unit which is associated with the segment A and is electrically conductively connected to the section of the respective bus signal path 38, 40, 44 associated with the segment A, as well as having a transmission and reception unit associated with the segment B which is electrically conductively connected to the section of the respective bus signal path 38, 40, 44 associated with the segment B. These transmission and reception units ensure the non-galvanic signal transmission between the sections of the bus signal path 38, 40, 44. Instead of a combined transmission and reception unit also pure transmission units and pure reception units can be used which are each correspondingly selected in accordance with the signal flow direction at the respective bus signal path 38, 40, 44 and which are associated with a segment A, B. Preferably, each transmission or reception unit or each combined transmission and reception unit associated with a segment A, B is supplied with a current via that current supply unit 16a, 16b and those current supply lines 46a, 46b, 48a, 48b which are associated with the same segment A, B, wherein the previously described galvanic separation of the current supply lines 46a, 46b, 48a, 48b can be maintained. The corresponding connection for the current supply of the coupling units 142 to the current supply lines 46a, 46b, 48a, 48b are not separately illustrated in FIG. 2.

The electromagnetic tolerance (EMT) of the safety system is considerably increased through the segmentation of the safety system with reference to the energy supply and through the galvanic separation of the current supply lines 46a, 46b, 48a, 48b and the sections of the bus signal paths 38, 40, 44 between the segments A, B. Moreover, the current load for which the components of the safety system including the consumers 138a, 138b have to be designed, is reduced.

Figure 3:
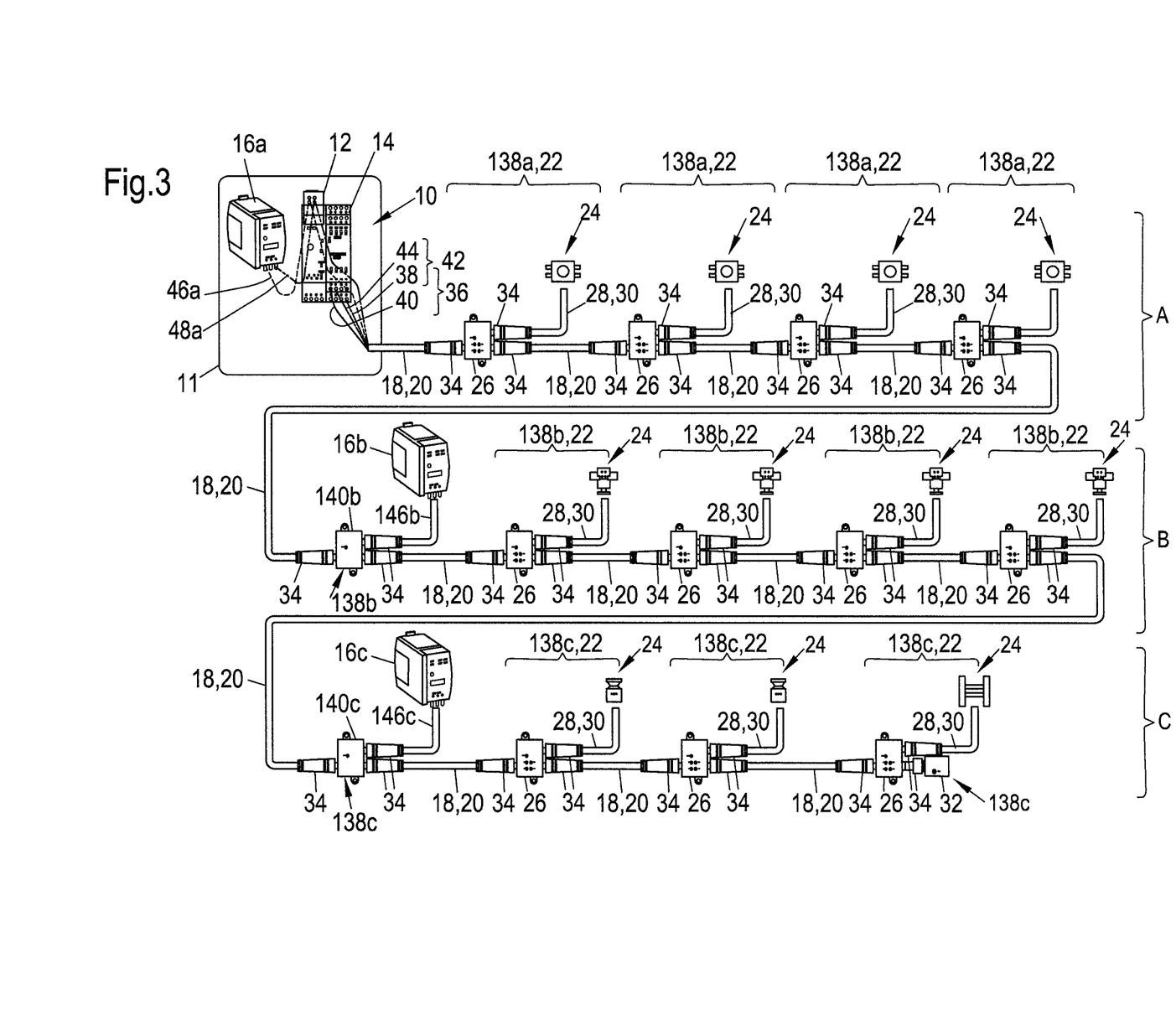
FIG. 3 a bus system in accordance with a further embodiment of the invention.

FIG. 3 shows a further bus system which substantially corresponds to the bus system shown in FIG. 2, but in this example comprises three segments A, B, C separated from one another in a galvanic manner and each having a plurality of consumers 138a, 138b, 138c which are connected to one another in a line via a bus line 18. However, it is also possible to provide more than three segments A, B, C separated from one another in a galvanic manner.

The safety control 10 arranged in a switching cabinet 11 has a main module 12 and an input/output module 14, wherein the main module 12 is directly connected to the current supply unit 16a associated with the segment A via which the safety control 10 is supplied with a current in such a way that in this embodiment the safety control 10 also represents a consumer of the segment A of the bus system. The current supply lines 46a, 48a between the current supply unit 16a and the safety control 10 are illustrated as separate lines in this example; however, can preferably also be arranged in a common cable 146a, 146b (FIGS. 1 and 2).

The remaining segments B, C are connected to the respectively associated current supply unit 16b, 16c via the feed modules 140b, 140c associated with the respective segment B, C, wherein the feed modules 140b, 140c are arranged at the start side end of a line formed by the consumes 138b, 138c of the respective segments B, C together with the bus line 18 and realize the described galvanic separation between the segments A, B, C.

The consumers 138a of the segment A are respectively formed by a safety related participant 22 with the exception of the safety control 10, wherein the protective devices 24 of the safety related participants 22 of the segment A in the present embodiment are respectively formed by an emergency cutoff switch symbolically illustrated in FIG. 3. The consumers 138b of the segment B are respectively formed by a safety related participant 22 with the exception of the feed module 140b, wherein the protective devices 24 of the safety related participants 22 of the segment B in the present embodiment are respectively formed by a locking apparatus for a safety door symbolically illustrated in FIG. 3. The consumers 138c of the segment C are respectively formed by a safety related participant 22 with the exception of the feed module 140c and the termination element 32, wherein the protective devices 24 of the two safety related participants 22 of the segment C illustrated on the left hand side in FIG. 3 are respectively by a laser scanner symbolically illustrated in FIG. 3 which can e.g. comprise an OSSD output and wherein the protective device 24 of the safety related participant 22 of the segment C illustrated on the right hand side in FIG. 3 is formed by a light curtain and/or a light grid.

LIST OF REFERENCE NUMERALS 10 safety control
11 switching cabinet
12 main module
14 input/output module
16a, 16b, 16c current supply unit
18 bus line
20 bus cable
22 safety related participant
24 protective device
26 interconnection module
28 interconnection cable
30 interconnection line
32 termination element
34 plug connector
35a, 35b bus signal path section
36 bus signal path, test signal path
38 bus signal path, forward path
40 bus signal path, return path
42 data path
44 data return path
46a, 46b first current supply line
48a, 48b second current supply line
50 logic unit, evaluation unit
54 signal path
56 logic unit
62 test circuit
64 connection
68 input/output interface
70 signal conductor
134a, 134b first connection
136a, 136b second connection
138a, 138b, 138c consumer
140b, 140c feed module
142 coupling unit
146a, 146b, 146c cable
148a, 148b electrical fuse
A, B, C segment
I1 safety input
I2 input
X1 output

The invention claimed is:

1. A bus system comprising
a bus line (18);
a plurality of consumers (138a, 138b, 138c) of electrical power which are connected to one another via the bus line (18);
a plurality of separate electrical supply units (16a, 16b, 16c) which respectively provide an electric voltage for the current supply of at least one consumer (138a, 138b, 138c); and
at least one feed module (140b, 140c) which is associated with a segment (B, C) of the bus system and via which the associated current supply unit (16b, 16c) is connected to one or more consumers (138b, 138c) of this segment (B, C) of the bus system for the provision of the electric voltage,
wherein the bus system is divided into segments (A, B, C) each having one or more consumers (138a, 138b, 138c) which are respectively associated with a current supply unit (16a, 16b, 16c) and which each have a first current supply line (46a, 46b) and a second current supply line (48a, 48b) via which the one or more consumers (138a, 138b, 138c) of the respective segment (A, B, C) are electrically conductively connected to the associated current supply units (16a, 16b, 16c) and between which the electric voltage of the associated current supply unit (16a, 16b, 16c) is provided;
and wherein the first current supply line (46a, 46b) and the second current supply line (48a, 48b) of a segment (A, B, C) are respectively not directly electrically conductively connected to the first current supply line (46a, 46b) and to the second current supply line (48a, 48b) of a different segment (A, B, C).

2. The bus system in accordance with claim 1,
wherein the first current supply line (46a, 46b) and the second current supply line (48a, 48b) of a segment (A, B, C) are respectively not directly electrically conductively connected to the first current supply line (46a, 46b) and to the second current supply line (48a, 48b) of a different segment (A, B, C) and are separated from the first current supply line (46a, 46b) and from the second current supply line (48a, 48b) of the other segment (A, B, C) in a galvanic manner.

3. The bus system in accordance with claim 1,
further comprising at least one further bus signal path (35a, 35b; 38, 40, 44) at least sectionally arranged in the bus line (18) via which bus signal path the consumers (138a, 138b, 138c) are connected to one another.

4. The bus system in accordance with claim 3,
wherein the at least one bus signal path (35a, 35b; 38, 40, 44) comprises a plurality of sections which are coupled to one another for the signal transmission by means of at least one coupling unit (142) in a non-galvanic manner.

5. The bus system in accordance with claim 4,
wherein the signal transmission by means of at least one coupling unit (142) in a non-galvanic manner is carried out in one of an optical manner, an inductive manner and a capacitive manner.

6. The bus system in accordance with claim 3,
wherein two sections of the at least one bus signal path (35a, 35b; 38, 40, 44) are associated with different segments (A, B, C) of the bus system and are electrically conductively connected to the consumers (138a, 138b, 138c) of the respectively associated segment (A, B, C).

7. The bus system in accordance with claim 1,
wherein the first and/or the second current supply line (46a, 48a, 46b, 48b) of at least one segment (A, B, C) is at least sectionally arranged in the bus line (18), wherein the first and/or the second current supply line (46a, 48a, 46b, 48b) of the segment (A, B, C) is arranged together with a section of a bus signal path (35a, 35b; 38, 40, 44) of the bus system in a common bus cable (20).

8. The bus system in accordance with claim 7,
wherein the first and/or the second current supply line (46a, 48a, 46b, 48b) of the segment (A, B, C) is/are arranged at least sectionally together with a section of a bus signal path (35a, 35b; 38, 40, 44) of the bus system in a common bus cable (20).

9. The bus system in accordance with claim 1,
wherein, starting from the current supply unit (16a, 16b, 16c) associated with the segment (A, B, C), the consumers (138a, 138b, 138c) of one segment (A, B, C) are connected in a row one after the other to the current supply unit (16a, 16b, 16c) associated with the segment (A, B, C) via the first and/or the second current supply line (46a, 48a, 46b, 48b) of the segment (A, B, C).

10. The bus system in accordance with claim 1,
wherein the feed module (140b, 140c) is connected both to the first and the second current supply line (46b, 48b) of the segment (B, C) of the bus system associated with the feed module (140b, 140c) and to the first and the second current supply lines (46a, 48a) of an adjacent segment (A, B, C) of the bus system and the first and the second current supply lines (46a, 48a, 46b, 48b) of the two segments (A, B, C) are separated from one another in a galvanic manner in the feed module (140b, 140c).

11. The bus system in accordance with claim 1,
wherein the feed module (140b, 140c) has at least one coupling unit (142) for the signal transmitting non-galvanic coupling of two sections of a bus signal path (35a, 35b; 38, 40, 44) connected to the feed module (140b, 140c).

12. The bus system in accordance with claim 11,
wherein a section of the bus signal path (35a, 35b; 38, 40, 44) is connected to the consumers (138b, 138c) of the segment (B, C) of the bus system associated with the feed module (140b, 140c) and the other section is connected to the consumers (138a, 138b, 138c) of a segment (A, B, C) adjacent thereto.

13. The bus system in accordance with claim 12,
wherein the section of the bus signal path (35a, 35b; 38, 40, 44) is electrically conductively connected to the consumers (138b, 138c) of the segment (B, C) of the bus system associated with the feed module (140b, 140c) and the other section is electrically conductively connected to the consumers (138a, 138b, 138c) of a segment (A, B, C) adjacent thereto.

14. The bus system in accordance with claim 1,
further comprising at least one electrical fuse (148a, 148b) arranged in the first and/or the second current supply line (46a, 48a, 46b, 48b) of a segment (A, B, C).

15. The bus system in accordance with claim 14,
wherein the at least one electrical fuse (148a, 148b) is a current limiting electrical fuse.

16. A bus system comprising
a bus line (18);
a plurality of consumers (138a, 138b, 138c) of electrical power which are connected to one another via the bus line (18);
a plurality of separate electrical supply units (16a, 16b, 16c) which respectively provide an electric voltage for the current supply of at least one consumer (138a, 138b, 138c); and
a safety system which comprises
a safety control (10) having an output (X1) and a safety input (I1) which are connected to the bus line (18) of the bus system, and
a plurality of safety related participants (22) connected to the bus line (18), said safety related participants respectively comprising a protective device (24);
wherein the bus system is divided into segments (A, B, C) each having one or more consumers (138a, 138b, 138c) which are respectively associated with a current supply unit (16a, 16b, 16c) and which each have a first current supply line (46a, 46b) and a second current supply line (48a, 48b) via which the one or more consumers (138a, 138b, 138c) of the respective segment (A, B, C) are electrically conductively connected to the associated current supply units (16a, 16b, 16c) and between which the electric voltage of the associated current supply unit (16a, 16b, 16c) is provided;
wherein the first current supply line (46a, 46b) and the second current supply line (48a, 48b) of a segment (A, B, C) are respectively not directly electrically conductively connected to the first current supply line (46a, 46b) and to the second current supply line (48a, 48b) of a different segment (A, B, C);
wherein the bus line (18) and the safety related participants (22) connected to the bus line (18) form a test signal path (36) having a forward path (38) connected to the output (X1) of the safety control (10) and a return path (40) connected to the safety input (I1) of the safety control (10);
wherein the safety related participants (22) are adapted in such a way that the presence of a non-secure state of the associated protective device (24) brings about an interruption of the test signal path (36);
and wherein the safety control (10) is configured to transmit an output signal at the output (X1) connected to the forward path (38).

17. The bus system in accordance with claim 16,
wherein the safety related participants (22) are arranged along the bus line (18) in a line in such a way that both the forward path (38) and the return path (40) of the test signal path (36) run through the same safety related participants (22); and wherein the bus system comprises a termination element (32) connected at the end of the line and connecting the forward path (38) and the return path (40) of the test signal path (36);

and wherein the termination element (32) is configured to receive the output signal from the forward path (38) and to output a test signal to the return path (40) of the test signal path (36) in dependence on the output signal received from the forward path (38), said test signal being changed with respect to the received output signal.

18. A feed module (140b, 140c) for the connection of consumers (138a, 138b, 138c) of electrical power of a bus system connected to one another via a bus line (18) to a current supply unit (16b, 16c), comprising:

a first plug connection element (34) having a first and a second connection for the connection respectively to a supply side section of a first and a second current supply line (46b, 48b) of a segment (B, C) of the bus system associated with the feed module (140b, 140c) and a current supply unit (16b, 16c) connected thereto;

a second plug connection element (34) having a first and a second connection for the connection respectively to a consumer side section of the first and the second current supply line (46b, 48b) and to at least a third connection for the connection to a section of at least one bus signal path (35a, 35b; 38, 40, 44) associated with the segment (B, C);

wherein the first and the second connections of the first and the second plug connection element (34) are connected to one another in an electrically conductive manner;

a third plug connection element (34) having a first and a second connection for the connection to a respective first and second current supply line (46a, 48a) of an adjacent segment (A, B, C) of the bus system and to at least one third connection for the connection to at least one bus signal path (35a, 35b; 38, 40, 44) associated with the adjacent segment (A, B, C) of the bus system;

wherein the first and the second connections of the third plug connection element (34) are respectively separated from the first and the second connections of the first and the second plug connection elements (34) in a galvanic manner; and further comprising at least one coupling unit (142) for the signal transmitting non-galvanic coupling of the at least one third connection of the second plug connection element (34) to the at least one third connection of the third plug connection element (34).

* * * * *